United States Patent
Kang et al.

(10) Patent No.: US 11,772,705 B2
(45) Date of Patent: Oct. 3, 2023

(54) SIDE SILL ASSEMBLY FOR ECO-FRIENDLY VEHICLE

(71) Applicants: HYUNDAI MOTOR COMPANY, Seoul (KR); KIA MOTORS CORPORATION, Seoul (KR)

(72) Inventors: Pil-Won Kang, Seoul (KR); Kyung-Bin Kim, Busan (KR); Min-Uke Han, Gwangmyeong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 238 days.

(21) Appl. No.: 17/187,438

(22) Filed: Feb. 26, 2021

(65) Prior Publication Data
US 2022/0041218 A1   Feb. 10, 2022

(30) Foreign Application Priority Data
Aug. 10, 2020  (KR) .......... 10-2020-0099841

(51) Int. Cl.
| B62D 21/15 | (2006.01) |
| B62D 25/02 | (2006.01) |
| B62D 25/20 | (2006.01) |
| B60K 1/04 | (2019.01) |
| B62D 29/00 | (2006.01) |
| B62D 27/02 | (2006.01) |

(52) U.S. Cl.
CPC .......... *B62D 21/157* (2013.01); *B60K 1/04* (2013.01); *B62D 25/025* (2013.01); *B62D 25/2036* (2013.01); *B62D 27/02* (2013.01); *B62D 29/008* (2013.01); *B60K 2001/0438* (2013.01)

(58) Field of Classification Search
CPC ....................................... B62D 21/157
See application file for complete search history.

(56) References Cited

U.S. PATENT DOCUMENTS

| 6,068,330 | A | * | 5/2000 | Kasuga | B62D 21/15 280/789 |
| 6,712,392 | B2 | * | 3/2004 | Young | B62D 21/00 180/311 |
| 2001/0017477 | A1 | * | 8/2001 | Rajasingham | B62D 21/15 296/187.12 |
| 2017/0001667 | A1 | * | 1/2017 | Ashraf | B60K 1/00 |
| 2020/0114972 | A1 | * | 4/2020 | Lee | B62D 29/005 |
| 2020/0140018 | A1 | * | 5/2020 | Grottke | B62D 25/2036 |

FOREIGN PATENT DOCUMENTS

KR   20-1997-0051616 U   9/1997

* cited by examiner

*Primary Examiner* — Paul N Dickson
*Assistant Examiner* — Shams Dhanani
(74) *Attorney, Agent, or Firm* — LEMPIA SUMMERFIELD KATZ LLC

(57) ABSTRACT

A side sill assembly for an eco-friendly vehicle protects a high voltage battery mounted therein from shock upon side collision. The side sill assembly includes: a center member 11 fastened to a side surface of a center floor panel 23 for a vehicle, a front outer member 12 fastened to a front end of the center member 11, and a rear outer member 14 fastened to the rear end of the center member 11, in which each of the center member 11, the front outer member 12, and the rear outer member 14 has a cylindrical cross section and at least one partition wall for partitioning the inside thereof horizontally and vertically to absorb collision energy upon side collision.

18 Claims, 14 Drawing Sheets

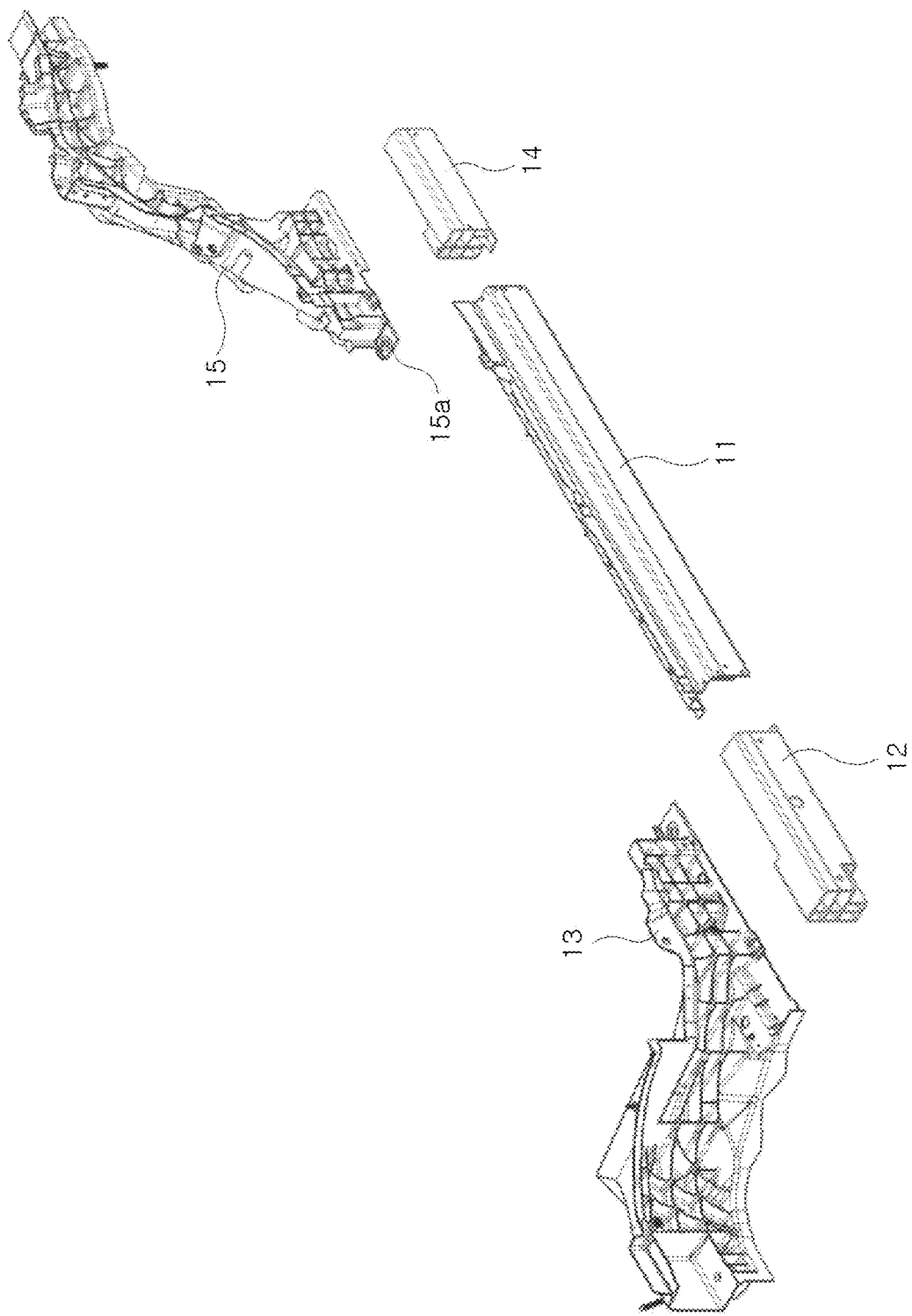

SIDE SILL ASSEMBLY FOR ECO-FRIENDLY VEHICLE

CROSS-REFERENCE TO RELATED APPLICATION

The present application claims priority to and the benefit of Korean Patent Application No. 10-2020-0099841, filed on Aug. 10, 2020, the entire contents of which are incorporated herein by reference.

FIELD

The present disclosure relates to a side sill assembly for supporting the lower portion of the side surface of a vehicle.

BACKGROUND

The statements in this section merely provide background information related to the present disclosure and may not constitute prior art.

A side sill for supporting the lower portion of the side surface of a vehicle is provided.

Meanwhile, eco-friendly vehicles such as an electric vehicle and a hybrid vehicle use the lower portion of a center floor panel for the vehicle as a mounted space of a high voltage battery for supplying a power source to a driving motor.

The high voltage battery is located below the center floor panel, and the high voltage battery is fastened to the center floor panel and the side sill, such that the high voltage battery is mounted.

We have discovered that a side sill according to the related art presses the side surface of the high voltage battery while the side sill is deformed upon side collision of the vehicle, when the strength thereof is insufficient, thereby breaking the high voltage battery. The breakage of the high voltage battery causes fire, thereby causing larger damage.

In addition, the side sill is formed of one piece from the lower portion of a front pillar of the vehicle to a rear wheel house of the vehicle, such that it is not easy to handle the side sill when manufacturing the vehicle.

The contents described in Background are to help the understanding of the background of the present disclosure, and may include what is not previously known to those skilled in the art to which the present disclosure pertains.

SUMMARY

The present disclosure provides a side sill assembly for an eco-friendly vehicle, which reduces the deformation due to the shock upon side collision.

The present disclosure further provides a side sill assembly for an eco-friendly vehicle, which manufactures side sills separately, and then integrates the side sills with the vehicle when assembling the vehicle, thereby facilitating the handling of the side sill when manufacturing the vehicle.

A side sill assembly for an eco-friendly vehicle according to the present disclosure includes: a center member fastened to a side surface of a center floor panel for a vehicle; a front outer member fastened to a front end of the center member; and a rear outer member fastened to a rear end of the center member, in which each of the center member, the front outer member, and the rear outer member has a cylindrical cross section at least one partition wall for partitioning the inside thereof horizontally and vertically to absorb collision energy upon side collision.

The center member, the front outer member, and the rear outer member are manufactured by extrusion.

A connection portion extending from the front end and rear end of the center member in a longitudinal direction of the center member, respectively, to cover outsides of the front outer member and the rear outer member is formed, and a fastening member fastens the center member and the front outer member or the center member and the rear outer member while penetrating and fastening the connection portion and the front outer member or the connection portion and the rear outer member.

The center member includes: an outer housing formed on the widthwise outside of the vehicle; an inner housing located inside the outer housing and having the upper end and the lower end connected to the outer housing in order to form a cylindrical structure; a main vertical partition wall for partitioning a space formed by the outer housing and the inner housing in the width direction of the vehicle; and a main horizontal partition wall for partitioning the space formed by the outer housing and the inner housing in the width direction of the vehicle, and crossing the main vertical partition wall.

The center member includes an auxiliary vertical partition wall for partitioning a space between the outer housing and the main vertical partition wall between the outer housing and the main vertical partition wall.

The center member includes an auxiliary horizontal partition wall for partitioning a space between the main horizontal partition wall and the inner housing downward from the main horizontal partition wall.

A high voltage battery is fastened to the center member by a fastening bolt penetrating a battery frame fastened to the side surface of the high voltage battery.

The fastening bolt has the lower portion and the upper portion fixed to the bottom surface of the inner housing and the auxiliary horizontal partition wall, respectively, and is fastened to a fastener having a pipe form with a thread formed therein.

A floor panel fastening portion fastened to the center floor panel for the vehicle from the inner housing toward the inside of the vehicle is formed, and the main horizontal partition wall is located at a position lower than the floor panel fastening portion.

A horizontal distance between the outer housing and the main vertical partition wall and a horizontal distance between the inner housing and the main vertical partition wall are formed to be the same as each other.

A horizontal distance between a battery frame fastened to the side surface of a high voltage battery and the inner housing is formed smaller than a horizontal distance between the inner housing and the main vertical partition wall.

The side sill assembly for an eco-friendly vehicle further includes: a front inner member located inside the front outer member and fastened to a front apron and a dash panel of the vehicle.

In a portion adjacent to the front end of a battery frame fastened to the side surface of a high voltage battery, the high voltage battery is fastened to the front inner member by a fastening bolt penetrating the battery frame.

In a portion in which the center member and the front inner member overlap each other, a high voltage battery is fastened to the front inner member by a fastening bolt penetrating a battery frame fastened to the side surface of the high voltage battery and the front inner member.

The bottom surface of the center member is formed with at least one guide hole in the longitudinal direction of the vehicle, and a battery frame fastened to the side surface of a high voltage battery is formed with a guide pin inserted into the guide hole.

The side sill assembly for an eco-friendly vehicle further includes: a rear inner member located inside the rear outer member, and fastened to a rear floor panel for the vehicle.

In a portion adjacent to the rear end of a battery frame fastened to the side surface of a high voltage battery, the high voltage battery is fastened to the rear inner member by a fastening bolt penetrating the battery frame.

In a portion in which the center member and the rear inner member overlap each other, the high voltage battery is fastened to the rear inner member and the center member by a fastening bolt penetrating a battery frame fastened to the side surface of the high voltage battery and the rear inner member.

The front outer member and the rear outer member are formed to have the same cross sections.

The front outer member includes: an outer housing formed on the widthwise outside of a vehicle; an inner housing located inside the outer housing and having the upper end and the lower end connected to the outer housing in order to form a cylindrical structure; at least one main horizontal partition wall for vertically partitioning a space formed by the outer housing and the inner housing; and a vertical partition wall for partitioning a space of the lower portion of the horizontal partition wall located on the lowermost end among the horizontal partition walls in the width direction of the vehicle.

The side sill assembly for the eco-friendly vehicle according to the present disclosure having the above configuration improves rigidity of the side sill assembly, thereby reducing the deformation of the side sill assembly upon side collision.

In addition to improving the rigidity of the side sill assembly, it is possible to secure the interval between the side sill assembly and the high voltage battery, thereby inhibiting the phenomenon in which the high voltage battery is damaged by the deformation of the side sill assembly upon side collision.

In addition, the side sill assembly is configured by fastening the front outer member and the rear outer member on the front and rear of the center member, respectively, thereby facilitating the handling of the side sill assembly when assembling the vehicle to improve the assemblability.

In the case of the structure in which the front outer member and the rear outer member are integrally formed on the front and rear of the center member, the length thereof is increased, thereby additionally requiring a facility for loading the side sill assembly. However, since the side sill assembly has the structure in which the front outer member and the rear outer member are separated from each other, it is easy to handle the respective components and it is possible to use the conventional facility as it is, thereby improving assemblability.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be d escribed various forms thereof, given by way of example, reference being made to the accompanying drawings, in which:

FIG. 2 is an exploded perspective diagram illustrating the side sill assembly for an eco-friendly vehicle according to one form of the present disclosure;

Figure 1:
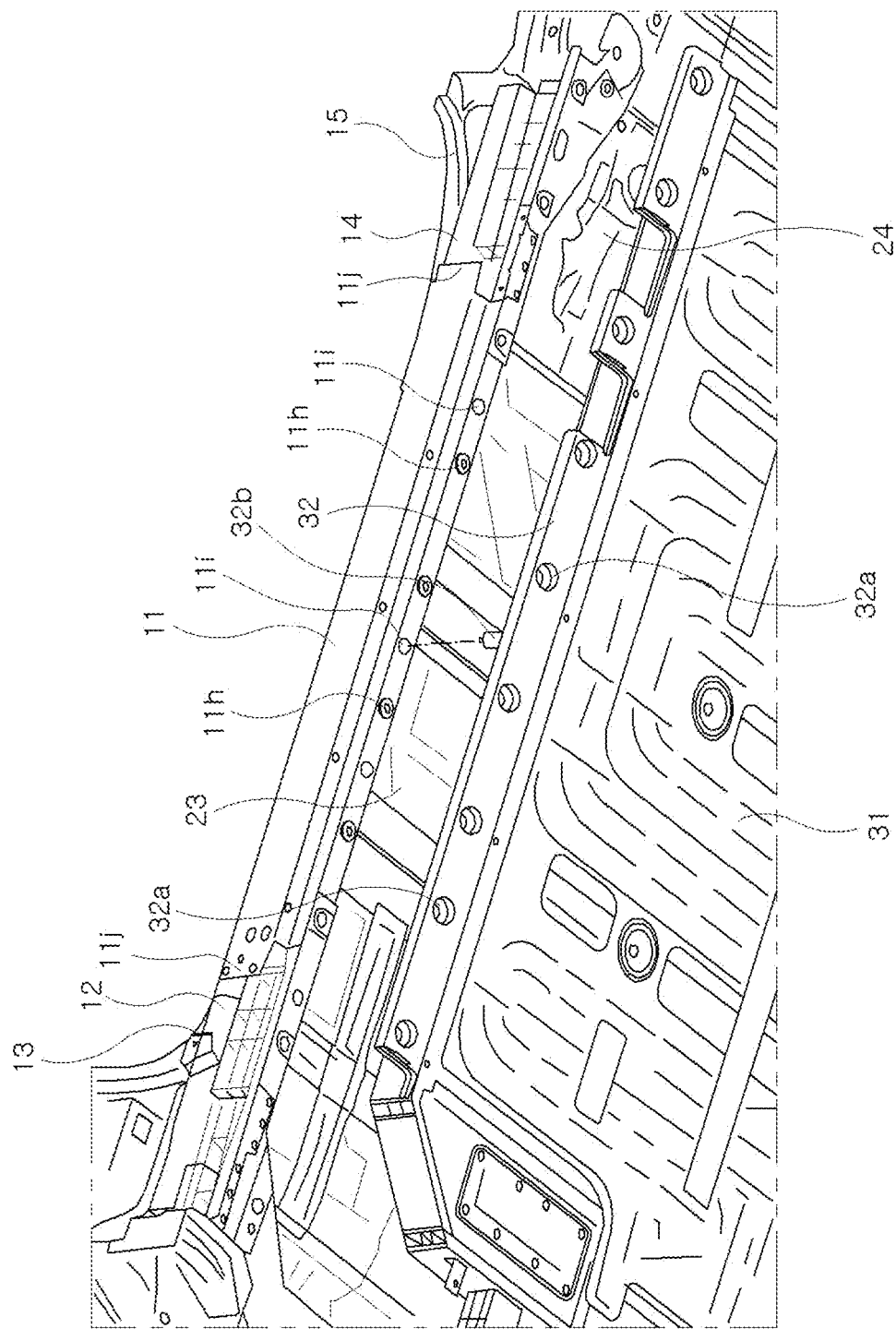
FIG. 1 is a bottom perspective diagram illustrating a side sill assembly for an eco-friendly vehicle according to one form of the present disclosure.
Figure 3A:
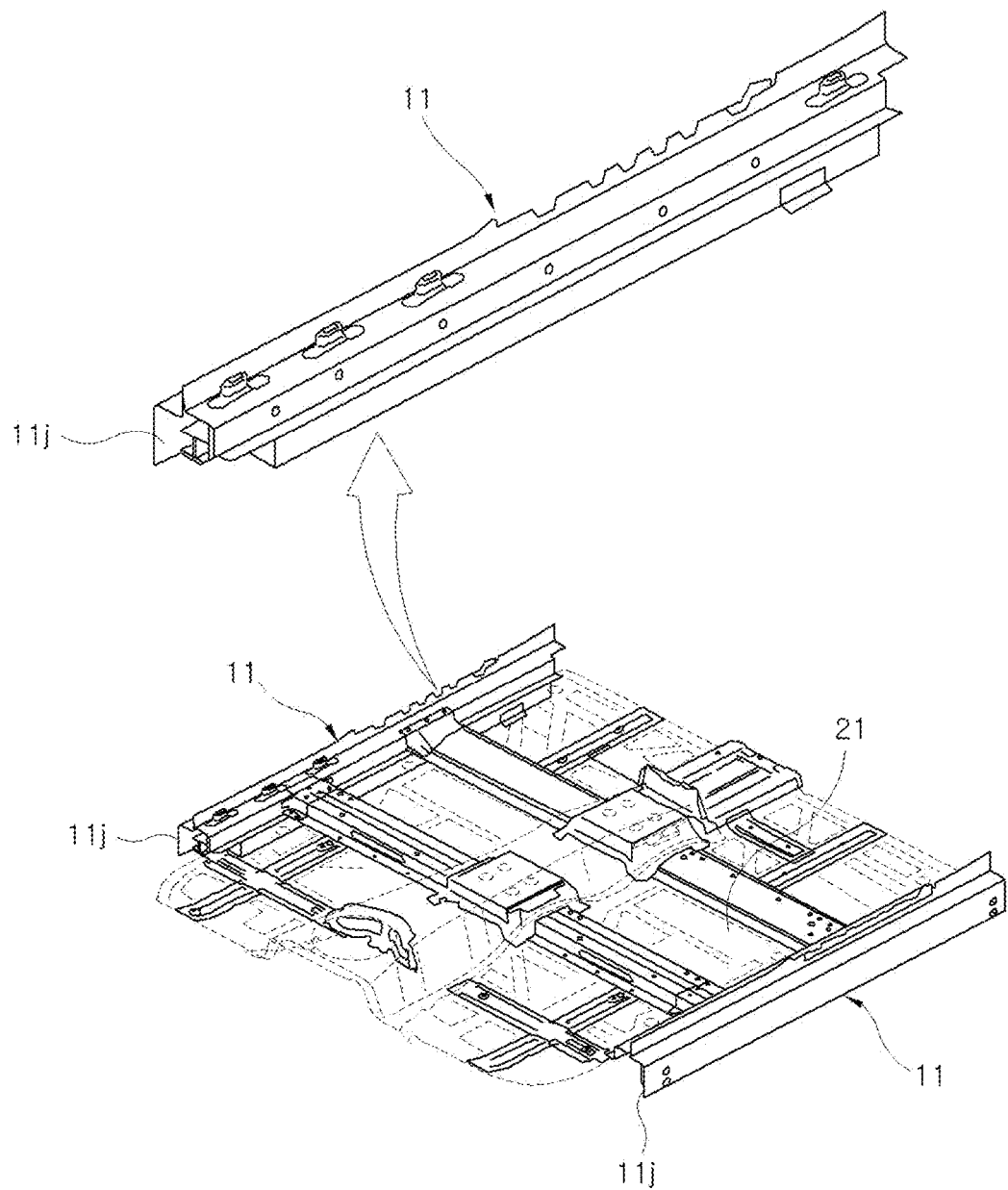
FIG. 3A is a perspective diagram illustrating a state where a center member and a center floor panel are fastened in the side sill assembly for an eco-friendly vehicle according to one form of the present disclosure.
Figure 3B:
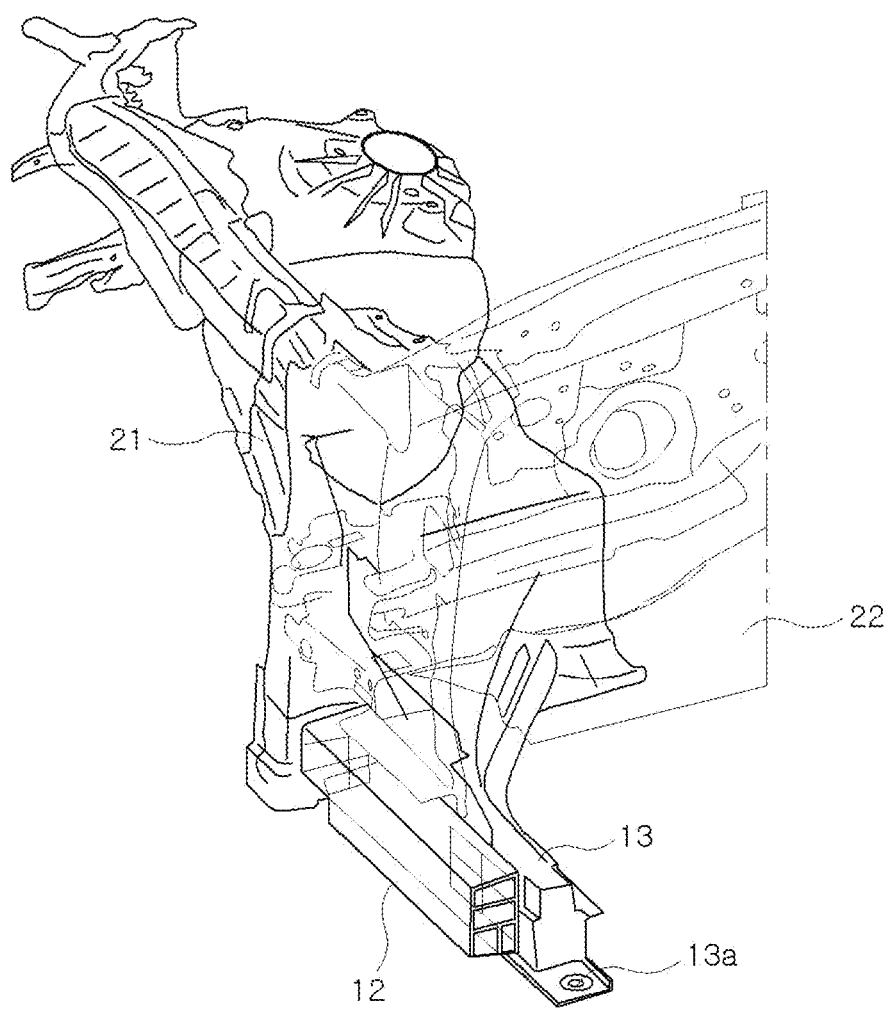
FIG. 3B is a perspective diagram illustrating a state where a front outer member, a front inner member, and a front apron are fastened in the side sill assembly for an eco-friendly vehicle according to one form of the present disclosure.
Figure 3C:
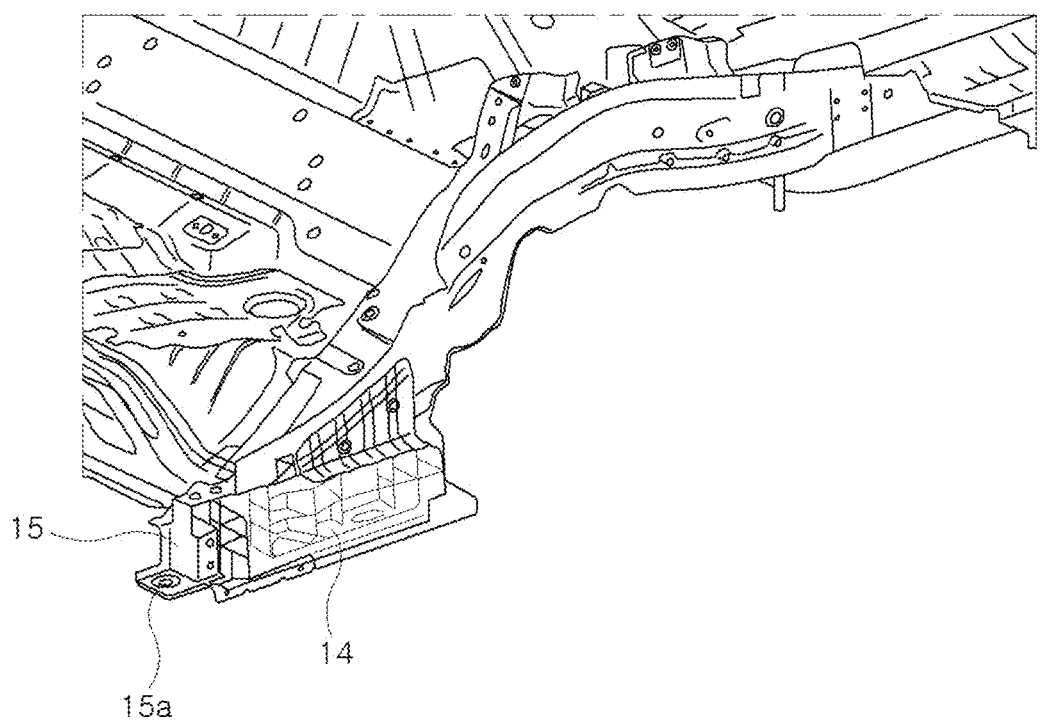
FIG. 3C is a perspective diagram illustrating a state where a rear outer member, a rear inner member, and a rear floor panel are fastened in the side sill assembly of an eco-friendly vehicle according to one form of the present disclosure.
Figure 4:
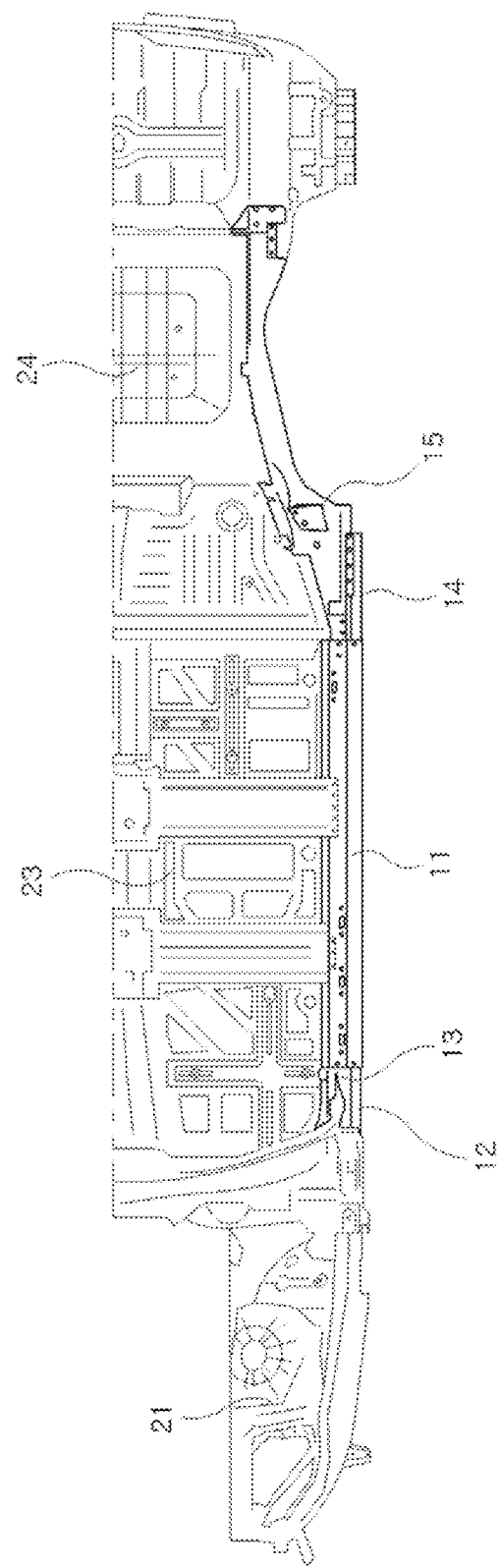
FIG. 4 is a plan diagram illustrating a vehicle body to which the side sill assembly for an eco-friendly vehicle according to one form of the present disclosure is applied.
Figure 5:
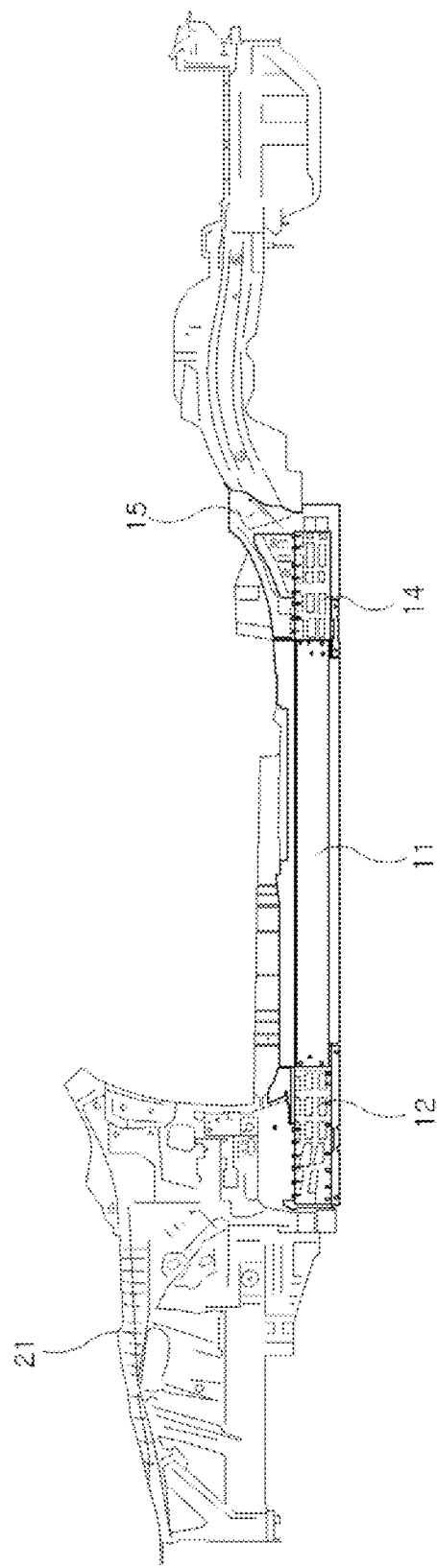
FIG. 5 is a side diagram illustrating the vehicle body to which the side sill assembly for an eco-friendly vehicle according to one form of the present disclosure is applied.
Figure 6:
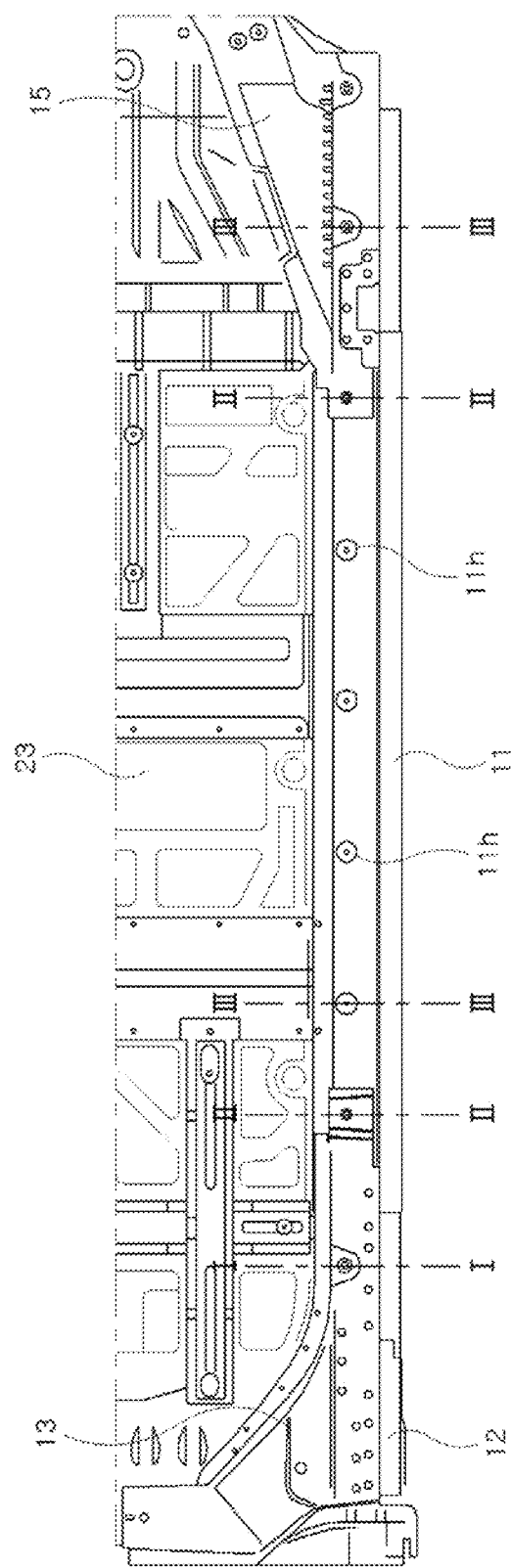
FIG. 6 is a bottom diagram illustrating the vehicle body to which the side sill assembly for an eco-friendly vehicle according to one form of the present disclosure is applied.
Figure 7:
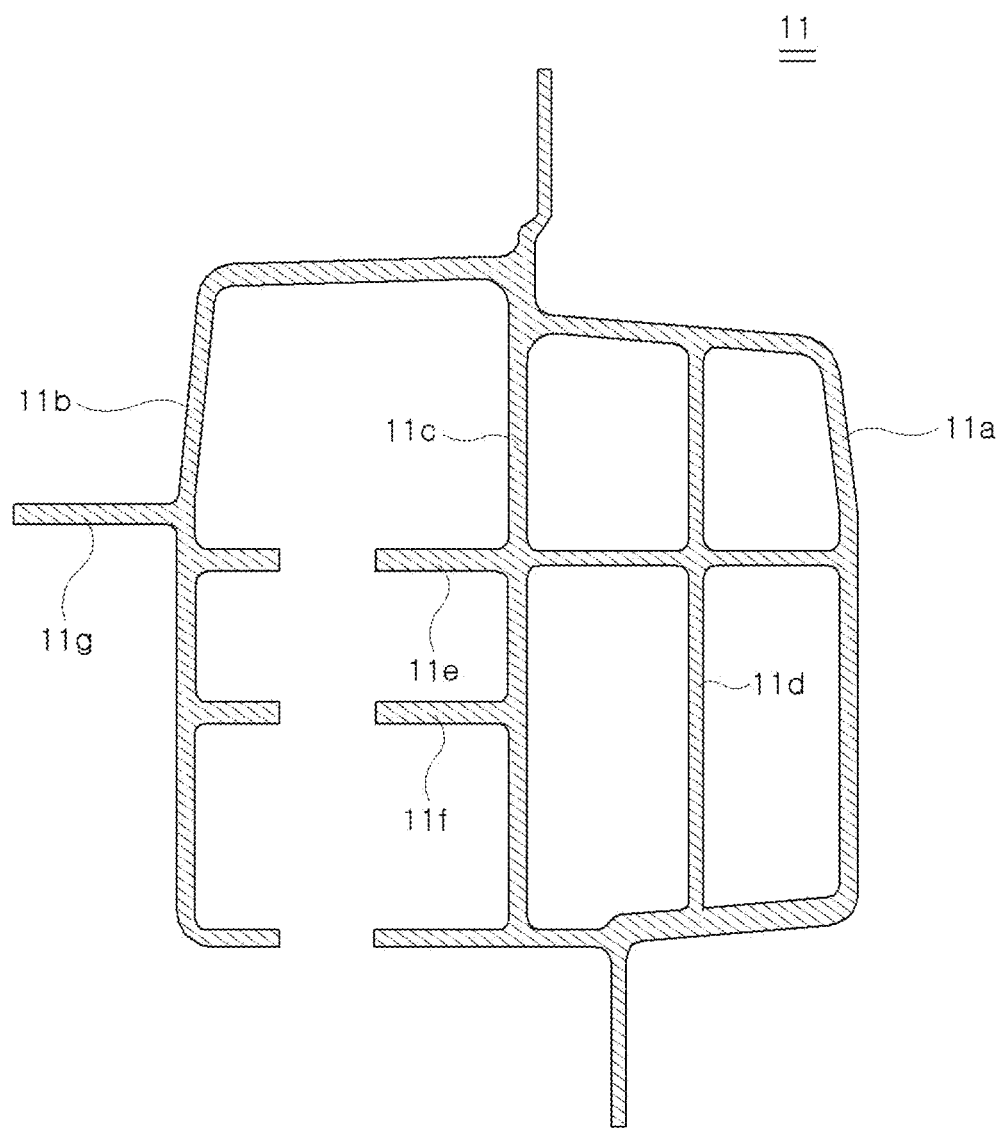
FIG. 7 is a cross-sectional diagram illustrating the center member in the side sill assembly for an eco-friendly vehicle according to one form of the present disclosure.
Figure 11:
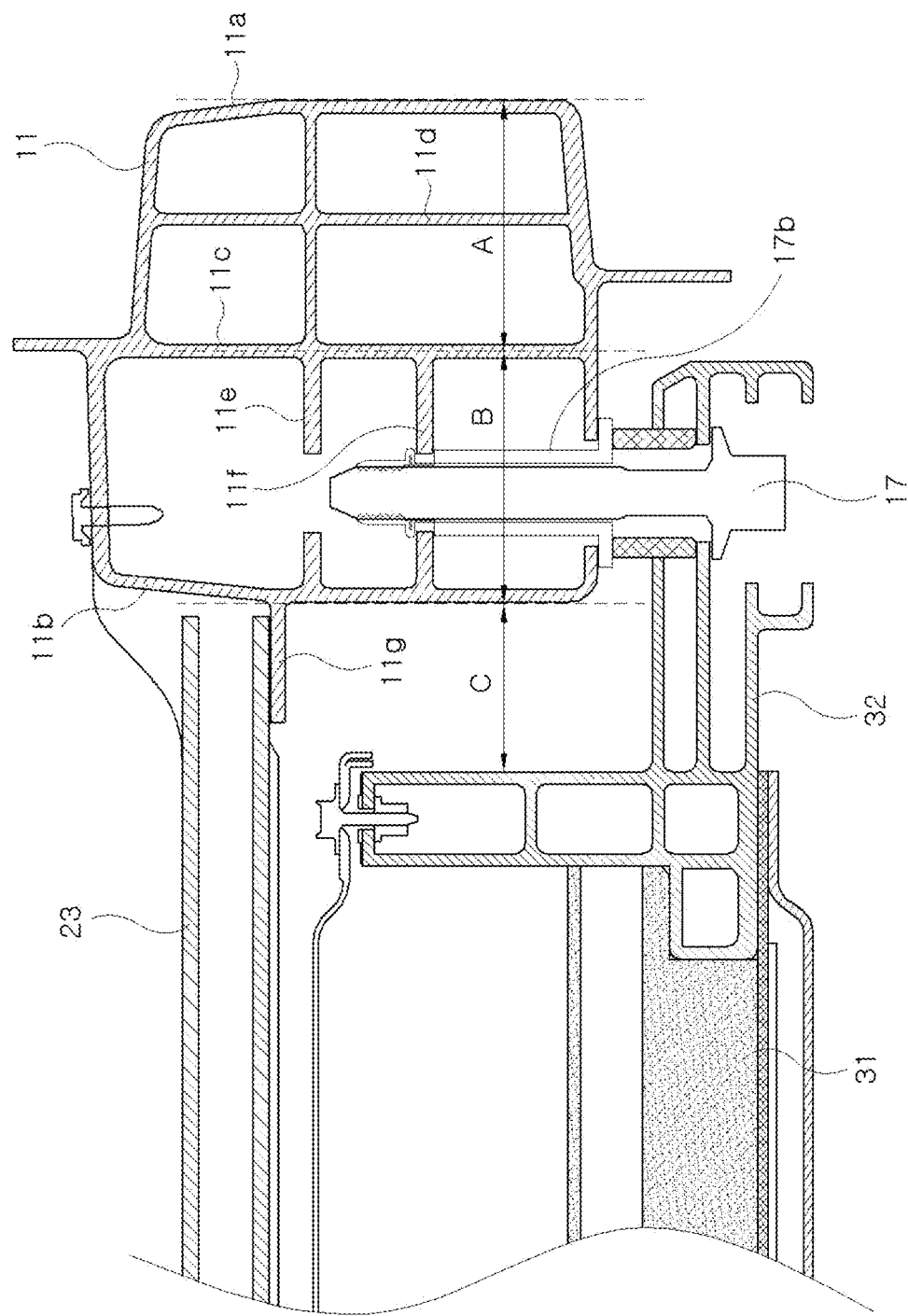
Figure 12:
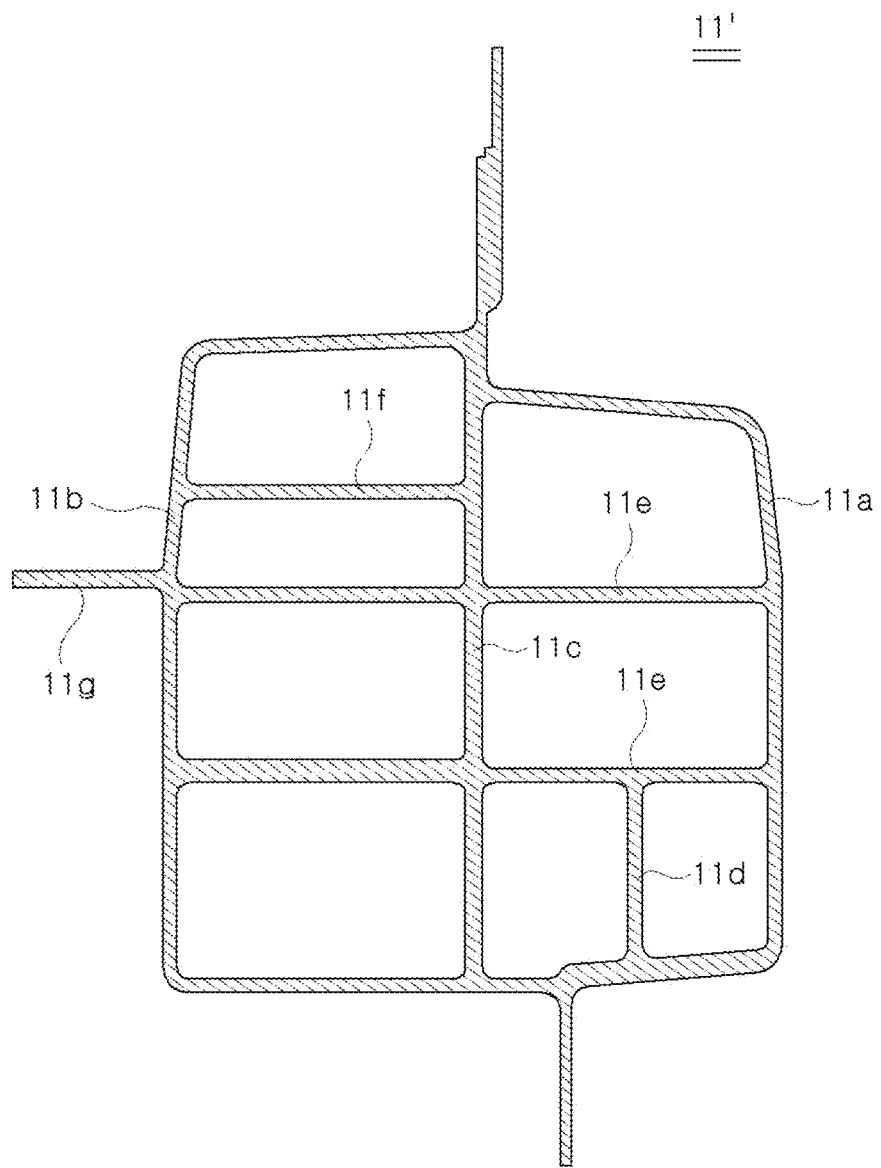

FIG. 11 a cross-sectional diagram taken along the line III-III illustrated in FIG. 6; and FIG. 12 is a cross-sectional diagram illustrating the center member applied to a side sill assembly for an eco-friendly vehicle according to another exemplary form the present disclosure.

The drawings described herein are for illustration purposes only and are n of intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a side sill assembly for an eco-friendly vehicle according to the present disclosure will be described in detail with reference to the accompanying drawings.

A side sill assembly for an eco-friendly vehicle according to the present disclosure includes a center member 11 fastened to the side surface of a center floor panel 23 for a vehicle, a front outer member 12 fastened to the front end of the center member 11, and a rear outer member 14 fastened to the rear end of the center member 11, in which each of the center member 11, the front outer member 12, and the rear outer member 14 has a cylindrical cross section, and has at least one partition wall partitioning the insides thereof horizontally and vertically to absorb collision energy upon side collision.

The side sill assembly for the eco-friendly vehicle according to the present disclosure includes the center member 11, the front outer member 12, the front inner member 13, the rear outer member 14, and the rear inner member 15.

In addition, the side sill assembly for the eco-friendly vehicle, such as an electric vehicle and a hybrid vehicle, according to the present disclosure is applied to a vehicle body structure for vehicles on which a high voltage battery 31 is mounted.

The center member 11 has a partition wall partitioning the inside thereof into a plurality of spaces.

The center member 11 includes an outer housing 11a formed on the widthwise outside of a vehicle, an inner housing 11b located inside the outer housing 11a and having the upper end and the lower end connected to the outer housing 11a in order to form the cylindrical structure, a main vertical partition wall 11c for partitioning a space formed by the outer housing 11a and the inner housing 11b in the width direction of the vehicle, and a main horizontal partition wall 11e for partitioning the inner space formed by the outer housing 11a and the inner housing 11b in the width direction of the vehicle, and crossing the main vertical partition wall 11c.

The outer housing 11a forms the widthwise outside of the vehicle in the center member 11.

The inner housing 11b forms the widthwise inside of the vehicle in the center member 11, and has the upper end and the lower end connected to the outer housing 11a. Since the outer housing 11a is convexly formed to the outside of the vehicle, and the inner housing 11b is convexly formed to the inside of the vehicle, the center member 11 has a cylindrical structure by the outer housing 11a and the inner housing 11b. The cylindrical structure formed by the outer housing 11a and the inner housing 11b has a substantially rectangular cross section.

The main vertical partition wall 11c partitions the space formed by the outer housing 11a and the inner housing 11b in the width direction of the vehicle. The space between the outer housing 11a and the main vertical partition wall 11c is located on the widthwise outside of the vehicle with respect to the main vertical partition wall 11c, and the space between the inner housing 11b and the main vertical partition wall 11c is located on the widthwise inside of the vehicle with respect to the main vertical partition wall 11c.

The main vertical partition wall 11c absorbs the initial energy upon collision together with the outer housing 11a upon side collision.

The main horizontal partition wall 11e partitions the inner space formed by the outer housing 11a and the inner housing 11b in the width direction of the vehicle.

In addition, the main horizontal partition wall 11e is formed to cross the intermediation portion of the main vertical partition wall 11c.

The main horizontal partition wall 11e crosses the main vertical partition wall 11c, thereby improving the rigidities of the outer housing 11a and the main vertical partition wall 11c against the side collision of the vehicle.

An auxiliary vertical partition wall 11d is formed to partition a space between the outer housing 11a and the main vertical partition wall 11c between the outer housing 11a and the main vertical partition wall 11c. Since the auxiliary vertical partition wall 11d is located on the outside of the vehicle compared to the main vertical partition wall 11c, the auxiliary vertical partition wall 11d absorbs the initial collision energy upon side collision together with the outer housing 11a. Therefore, it is possible to reduce the collision energy transferred to the main vertical partition wall 11c.

An auxiliary horizontal partition wall 11f partitions a space between the main horizontal partition wall 11e and the inner housing 11b downward from the main horizontal partition wall 11e. The auxiliary horizontal partition wall 11f is used to fasten a battery frame 32 fastened to the side surface of the high voltage battery 31 to the center member 11. That is, a fastener 17b penetrates and fixes the inner housing 11b and the auxiliary horizontal partition wall 11f, and a fastening bolt 17 is fastened to the fastener 17b, thereby fastening the battery frame 32 to the center member 11. A fastening hole 11h is formed in the bottom surface of the inner housing 11b in the center member 11, and a fastening hole 32a is also formed with the battery frame 32, and in a state of aligning the fastening holes 32a, 11h, the fastening bolt 17 may penetrate the fastening holes 32a, 11h to be screw-coupled to the fastener 17b, thereby fastening the battery frame 32 to the center member 11.

A floor panel fastening portion 11g is formed to protrude from the inner housing 11b toward the inside of the vehicle. The center floor panel 23 of the vehicle is fastened to the center member 11 through the floor panel fastening portion 11g.

At this time, the floor panel fastening portion 11g is formed such that the main horizontal partition wall 11e is located at a position lower than the floor panel fastening portion 11g. Therefore, the center floor panel 23 is located at a position higher than the main horizontal partition wall 11e, so that the space formed below the main horizontal partition wall 11e is located to be lower than the center floor panel 23.

Meanwhile, the center member 11 limits a distance between the outer housing 11a, the main vertical partition wall 11c, the inner housing, and the battery frame 32, thereby inhibiting the damage to the high voltage battery 31 upon side collision.

That is, as illustrated in FIG. 11, a horizontal distance (A) between the outer housing 11a and the main vertical partition wall 11c and a horizontal distance (B) between the inner housing 11b and the main vertical partition wall 11c are formed to be substantially the same as each other.

It is possible to secure the space capable of absorbing the initial energy upon collision through the distance (A) between the outer housing 11a and the main vertical partition wall 11c. Particularly, the main vertical partition wall 11c is located inside the outer housing 11a to absorb the collision energy while the outer housing 11a and the main vertical partition wall 11c are deformed, thereby reducing the collision energy transferred after the main vertical partition wall 11c.

The distance (B) between the inner housing 11b and the main vertical partition wall 11c is secured to suppress the additional deformation of the side sill assembly after side collision to inhibit the side sill assembly from intruding into the vehicle. Particularly, since the fastener 17b used to be fastened to the battery frame 32 is formed in a pipe form fixed to the auxiliary horizontal partition wall 11f and the bottom surface of the inner housing 11b, respectively, the connectivity between the auxiliary horizontal partition wall 11f and the inner housing 11b is increased, thereby improving rigidity.

In addition, a horizontal distance (C) between the battery frame 32 and the inner housing 11b is formed smaller than the horizontal distance (B) between the inner housing 11b and the main vertical partition wall 11c (C<B). The horizontal distance (C) between the battery frame 32 and the inner housing 11b becomes a predetermined distance or more for protecting the high voltage battery 31 when the side sill assembly invades into the vehicle due to the deformation. In one form, the distance (C) is 35 mm or more, and in another form, the distance is 39 mm or more.

The center member 11 is formed so that the aforementioned cross-sectional structure is constant in the longitudinal direction of the vehicle. To this end, the center member 11 is manufactured by extrusion.

The front outer member 12 is located on the front of the center member 11 and fastened to the center member 11.

Viewing the cross section of the front outer member 12, the front outer member 12 includes an outer housing 12a formed on the widthwise outside of the vehicle, an inner housing 12b located inside the outer housing 12a and having the upper end and the lower end connected to the outer housing 12a, a horizontal partition wall 12c for vertically partitioning a space formed by the outer housing 12a and the inner housing 12b, and a vertical partition wall 12d for partitioning a space below the horizontal partition in the width direction of the vehicle.

As in the center member 11, the front outer member 12 forms a cylindrical structure by the outer housing 12a and the inner housing 12b. However, the inner housing 12b is not formed to be convex to the inside of the vehicle. This is because the front outer member 12 is in charge of the outside portion of the side sill assembly on the front of the side sill assembly, and a front inner member 13 to be described later is in charge of the inside of the side sill assembly.

The horizontal partition wall 12c and the vertical partition wall 12d are formed to partition the space formed by the outer housing 12a and the inner housing 12b, thereby improving the rigidity of the front outer member 12.

Figure 8:
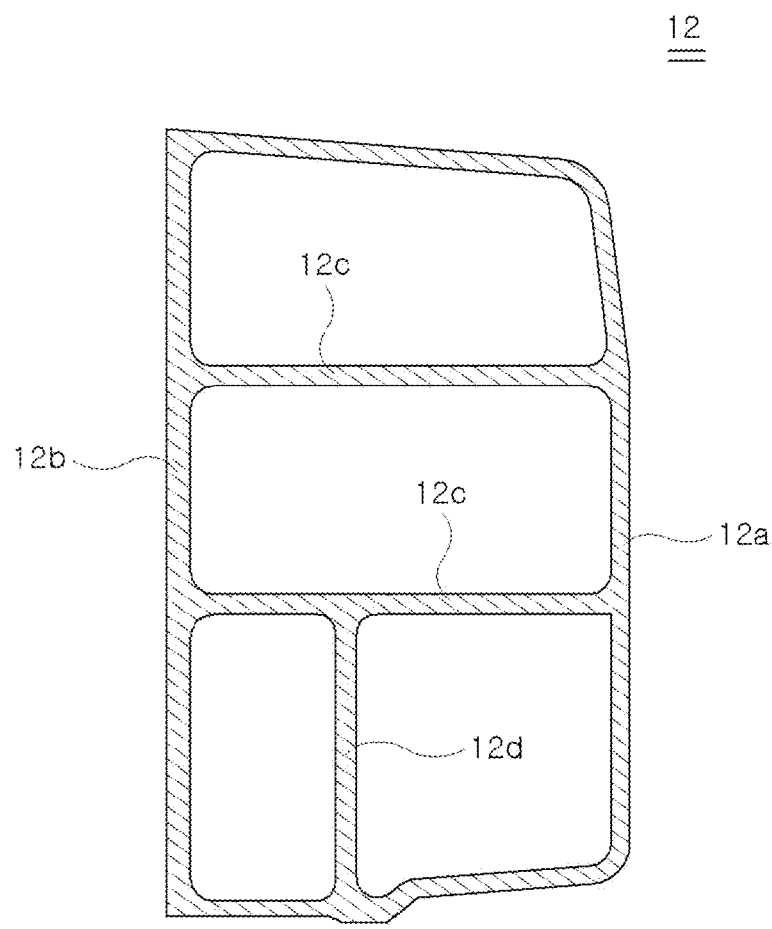
FIG. 8 is a cross-sectional diagram illustrating the front outer member in the side sill assembly for an eco-friendly vehicle according to one form of the present disclosure.

The horizontal partition wall 12c vertically partitions the space formed by the outer housing 12a and the inner housing 12b. In one form, at least one horizontal partition wall 12c is formed. FIG. 8 illustrates a configuration in which two horizontal partitions walls 12c are formed parallel to each other.

The vertical partition wall 12d is formed to partition the space formed by the horizontal partition wall 12c in the width direction of the vehicle. In one form, the vertical partition wall 12d is formed to partition the space below the horizontal partition wall located on the lowermost end among the horizontal partition walls 12c in the width direction of the vehicle.

A connection portion 11j is formed to extend from the front end and rear end of the center member 11 to the front side and rear end of the center member 11, respectively. The connection portion 11j is formed to cover and surround the front outer member 12 and the rear outer member 14, such that the connection portion 11j and the front outer member 12 or the connection portion 11j and the rear outer member 14 are formed to overlap each other. As described above, by penetrating and fastening the connection portion 11j and the front outer member 12, or penetrating and fastening the connection portion 11j and the rear outer member 14 using the fastening member in the state where the connection portion 11j and the front outer member 12 or the connection portion 11j and the rear outer member 14 overlap each other, such that the center member 11 is formed to have a structure of being connected to the front outer member 12 and the rear outer member 14.

The front inner member 13 is located inside the front outer member 12.

The front inner member 13 is located inside the front outer member 12 and fastened to the front outer member 12, thereby forming the front structure of the side sill assembly together with the front outer member 12.

The front inner member 13 has the rear end connected to the center member 11. Particularly, the front inner member 13 is connected to the inside of the center member 11, that is, the inner housing 11b and the main vertical partition wall 11c.

The front end of the front inner member 13 is also connected to the front apron 21, a dash panel, the lower portion of a front pillar, and the like to form a vehicle body structure.

The lower end of the front inner member 13 is formed with a fastening hole 13a for fastening to the battery frame 32.

The front inner member 13 has the rear end located behind the rear end of the front outer member 12. As the rear ends of the front outer member 12 and the front inner member 13 are formed to be stepped from each other, the front end of the center member 11 fastens the center member 11 and the front outer member 12 using the connection portion 11j formed to cover and surround the outside of the front outer member 12.

Since the front inner member 13 has a complicated shape, and the front end of the front inner member 13 is fastened to the front apron 21, the dash panel 22, the front pillar, and the like to exert rigidity even in the longitudinal direction of the vehicle, the front inner member 13 is manufactured by die casting.

The rear outer member 14 is located on the rear of the center member 11 and fastened to the center member 11.

The rear outer member 14 has the same cross-sectional structure as the front outer member 12. That is, the rear outer member 14 also includes an outer housing formed on the widthwise outside of the vehicle, an inner housing located inside the outer housing and having the upper end and the lower end connected to the outer housing, at least one horizontal partition wall for vertically partitioning a space formed by the outer housing and the inner housing, and a vertical partition wall for partitioning a space below the horizontal partition wall located on the lowermost among the vertical partition walls in the width direction of the vehicle to have a cylindrical shape, and rigidity is improved by the horizontal partition wall and the vertical partition wall.

The rear inner member 15 is located inside the rear outer member 14.

The rear inner member 15 is located inside the rear outer member 14 and fastened to the rear outer member 14, thereby forming the rear structure of the side sill assembly together with the rear outer member 14.

The front end of the rear inner member 15 is connected to the center member 11, which is a structure symmetrical to a structure in which the rear end of the front inner member 13 is connected to the front end of the center member 11. That is, the rear inner member 15 is connected to the inner housing 11b, which is the inside of the center member 11, and the main vertical partition wall 11c.

The rear inner member 15 is connected to a rear floor panel 25, a rear wheel house, and the like to form a vehicle body structure.

The lower end of the rear inner member 15 is formed with a fastening hole 15a for fastening to the battery frame 32.

In addition, the rear inner member 15 has the front end located before the front end of the rear outer member 14, such that the rear ends of the rear outer member 14 and the rear inner member 15 are formed to be stepped from each other. Therefore, as in the front end of the center member 11, the rear end of the center member 11 fastens the center member 11 and the rear outer member 14 using the connection portion 11j formed to surround the outside of the rear outer member 14.

The rear inner member 15 is manufactured by die casting.

As in the center member 11, the front outer member 12 and the rear outer member 14 also have cross-sectional structures formed to be constant in the longitudinal direction of the vehicle, and to this end, the front outer member 12 and the rear outer member 14 are manufactured by extrusion.

The high voltage battery 31 is fastened to the side sill assembly through the battery frame 32 fastened to the side surface of the high voltage battery 31.

The battery frame 32 is fastened to the circumference, particularly, the side surface of the high voltage battery 31 to support the high voltage battery 31.

The battery frame 32 is formed with a plurality of fastening holes 32a at intervals in the longitudinal direction of the vehicle. The fastening bolt 17 is inserted into the fastening hole 32a and fastened to the side sill assembly, thereby mounting the high voltage battery 31.

In the present disclosure, the side sill assembly is largely divided into three portions, and fastened to the battery frame 32 in different manners in the longitudinal direction of the vehicle.

Figure 9:
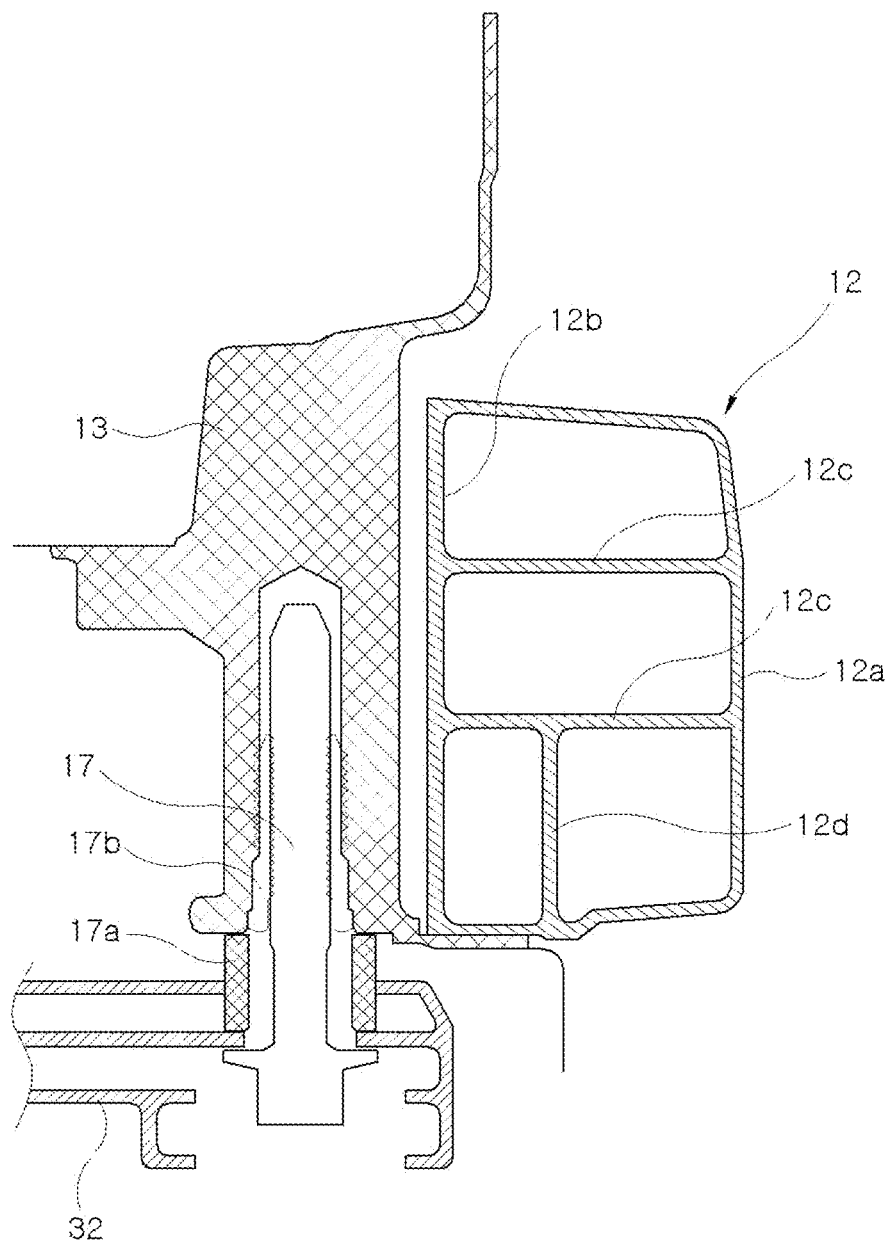
FIG. 9 is a cross-sectional diagram taken along the line I-I illustrated in FIG. 6.

First, in the portion in which the front outer member 12 and the front inner member 13 are located, the fastening bolt 17 penetrates the fastening hole 32a of the battery frame 32 and is fastened to the front inner member 13, such that the battery frame 32 is fastened (see FIG. 9).

Figure 10:
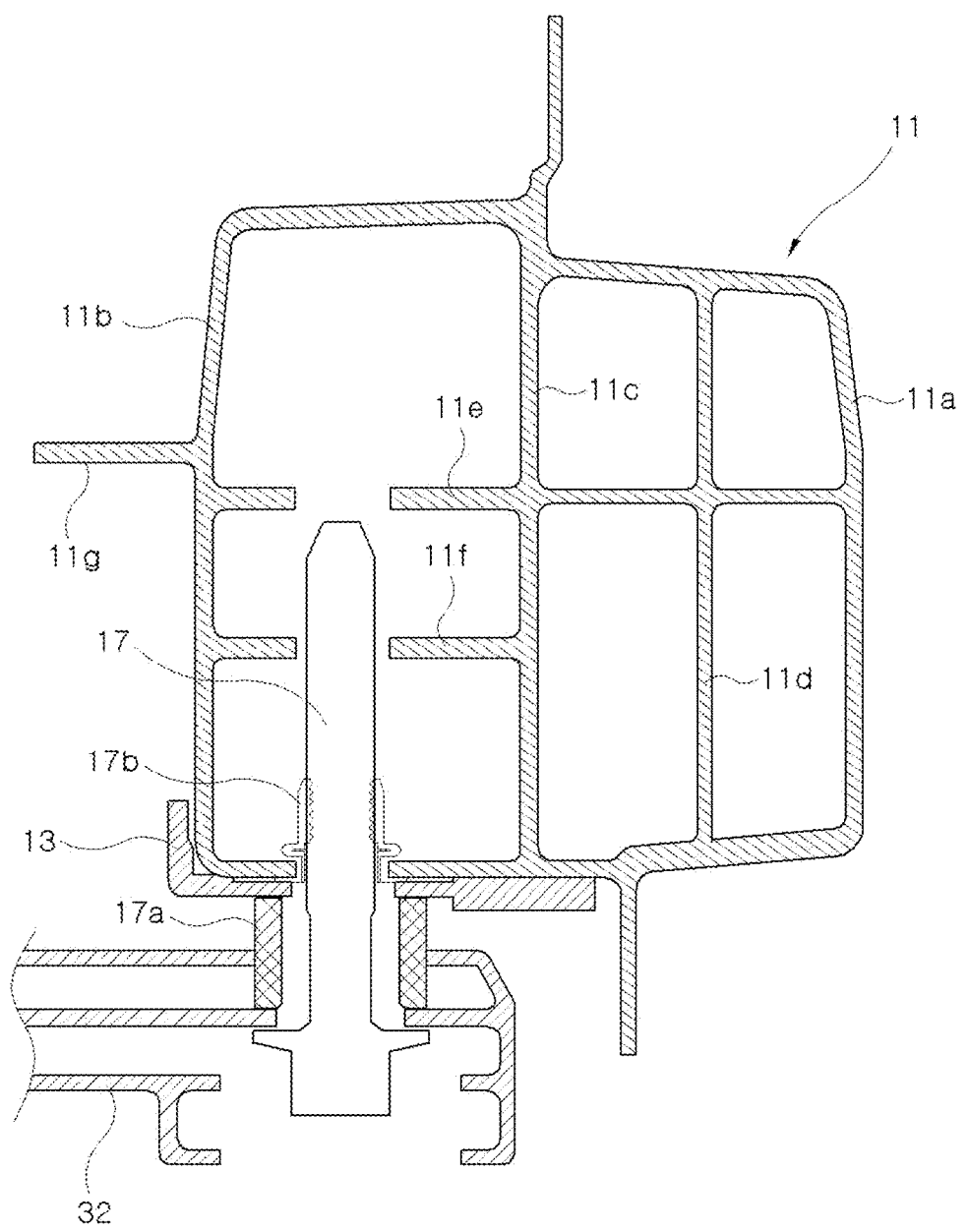
FIG. 10 is a cross-sectional diagram taken along the line II-II illustrated in FIG. 6.

In a portion in which the front outer member 12 and the front inner member 13 overlap the center member 11, that is, the front end of the center member 11, the fastening bolt 17 is fastened to the center member 11 after penetrating the fastening hole 32a of the battery frame 32 and the front inner member 13, such that the battery frame 32 is fastened (see FIG. 10).

In the remaining section other than the end of the center member 11, the fastening bolt 17 is fastened to the center member 11 after penetrating the fastening hole 32a of the battery frame 32, such that the battery frame 32 is fastened (see FIG. 11).

At this time, since the aforementioned fastener 17b is inserted into the center member 11, the connectivity between the auxiliary horizontal partition wall 11f and the inner housing 11b is increased in the center member 11.

Meanwhile, the structure in which the battery frame 32 is connected to the rear inner member 15 is the same as the structure in which the battery frame 32 is connected to the front inner member 13. That is, in the portion in which the rear outer member 14 and the rear inner member 15 are located, the fastening bolt 17 penetrates the fastening hole 32a of the battery frame 32 and is fastened to the rear inner member 15. In addition, in the portion in which the rear outer member 14 and the rear inner member 15 overlap the center member 11, that is, the rear end of the center member 11, the fastening bolt 17 is fastened to the center member 11 after penetrating the fastening hole 32a of the battery frame 32 and the rear inner member 15, such that the battery frame 32 is fastened.

The portion in which the front inner member 13 and the inner housing 11b are fastened in the battery frame 32 may be provided with a spacer 17a for inhibiting the battery frame 32 from directly contacting the front inner member 13 or the inner housing 11b.

Meanwhile, when the side sill assembly and the battery frame 32 are fastened, a configuration for guiding the location of the battery frame 32 is provided. For example, a guide pin 32b is formed to protrude upward from the battery frame 32, and a guide groove 11i for accommodating the guide pin 32b may be formed in the center member 11. When the battery frame 32 is located so that the guide pin 32b is inserted into the guide hole 11i, the battery frame 32 and the high voltage battery 31 are located in the correct locations.

A plurality of guide holes 11i and a plurality of guide pins 32b may also be formed in the longitudinal direction of the vehicle.

FIG. 12 illustrates a center member 11' applied to a side sill assembly for an eco-friendly vehicle according to another exemplary form of the present disclosure.

The center member 11' according to the present exemplary form is the same as that of the aforementioned exemplary form in that the side sill assembly is formed in a cylindrical structure by the outer housing 11a and the inner housing 11b, but has a difference in terms of the shape of the partition wall formed in the inner space thereof.

The main vertical partition wall 11c partitions the space formed by the outer housing 11a and the inner housing 11b in the width direction of the vehicle.

The main horizontal partition wall 11e partitions the space formed by the outer housing 11a and the inner housing 11b in the width direction of the vehicle, and the main horizontal partition wall 11e may be vertically disposed in the vertical direction of the vehicle. Particularly, the main horizontal partition wall 11e formed on the uppermost end among the main horizontal partition walls 11e is formed to have substantially the same height as the center floor panel 23. That is, as illustrated in FIG. 12, the floor panel fastening portion 11g for fastening the center member 11' to the center floor panel 23 is formed at substantially the same height as the main horizontal partition wall 11e formed on the uppermost end.

In addition, the auxiliary vertical partition wall 11d is formed to partition the space formed by the main horizontal partition wall 11e formed on the lowermost end among the main horizontal partition walls 11e, the main vertical partition wall 11c, and the outer housing 11a in the width direction of the vehicle.

The auxiliary horizontal partition wall 11f is formed to partition the space formed by the main horizontal partition wall 11e formed on the uppermost end among the main horizontal partition walls 11e, the main vertical partition wall 11c, and the inner housing 11b in the vertical direction of the vehicle.

What is claimed is:

1. A side sill assembly for an eco-friendly vehicle, the side sill assembly comprising:
   a center member fastened to a side surface of a center floor panel of the eco-friendly vehicle;
   a front outer member fastened to a front end of the center member; and
   a rear outer member fastened to a rear end of the center member,
   wherein each of the center member, the front outer member, and the rear outer member has a cylindrical cross-section and at least one partition wall configured to partition an inside thereof horizontally and vertically to absorb collision energy upon side collision,
   wherein the center member comprises:
      an outer housing formed on a widthwise outside of the vehicle;

an inner housing located inside the outer housing and having an upper end and a lower end connected to the outer housing such that a cylindrical structure is formed;

a main vertical partition wall configured to partition an inner space formed by the outer housing and the inner housing in a width direction of the vehicle;

a main horizontal partition wall configured to partition the inner space formed by the outer housing and the inner housing in the width direction of the vehicle, and cross the main vertical partition wall; and a floor panel fastening portion fastened to the center floor panel, and wherein the floor panel fastening portion horizontally extends from the inner housing toward an inside of the vehicle, and the main horizontal partition wall is located at a position lower than the floor panel fastening portion.

2. The side sill assembly of claim 1, wherein the center member, the front outer member, and the rear outer member are manufactured by extrusion.

3. The side sill assembly of claim 1, wherein a connection portion is extended from the front end and rear end of the center member in a longitudinal direction of the center member, respectively, and configured to cover outsides of the front outer member and the rear outer member, wherein a fastening member is configured to fasten the center member and the front outer member while penetrating and fastening the connection portion and the front outer member, and wherein the fastening member is configured to fasten the center member and the rear outer member while penetrating and fastening the connection portion and the rear outer member.

4. The side sill assembly of claim 1, wherein the center member includes an auxiliary vertical partition wall configured to partition a space between the outer housing and the main vertical partition wall.

5. The side sill assembly of claim 1, wherein the center member includes an auxiliary horizontal partition wall that is configured to partition a space between the main horizontal partition wall and the inner housing and is located below the main horizontal partition wall.

6. The side sill assembly of claim 5, wherein a high voltage battery is fastened to the center member by a fastening bolt penetrating a battery frame fastened to a side surface of the high voltage battery.

7. The side sill assembly of claim 6, wherein the fastening bolt has a lower portion and an upper portion fixed to a bottom surface of the inner housing and the auxiliary horizontal partition wall, respectively, and is fastened to a fastener having a thread formed therein.

8. The side sill assembly of claim 1, wherein a horizontal distance between the outer housing and the main vertical partition wall and a horizontal distance between the inner housing and the main vertical partition wall are formed to be same as each other.

9. The side sill assembly of claim 1, wherein a horizontal distance between a battery frame fastened to a side surface of a high voltage battery and the inner housing is smaller than a horizontal distance between the inner housing and the main vertical partition wall.

10. The side sill assembly of claim 1, further comprising: a front inner member located inside the front outer member and fastened to a front apron and a dash panel.

11. The side sill assembly of claim 10, wherein in a portion adjacent to a front end of a battery frame fastened to a side surface of a high voltage battery, the high voltage battery is fastened to the front inner member by a fastening bolt penetrating the battery frame.

12. The side sill assembly of claim 10, wherein in a portion in which the center member and the front inner member overlap each other, a high voltage battery is fastened to the front inner member and the center member by a fastening bolt penetrating a battery frame fastened to a side surface of the high voltage battery.

13. The side sill assembly of claim 1, wherein a bottom surface of the center member includes at least one guide hole arranged in a longitudinal direction of the vehicle, and a battery frame is fastened to the side surface of a high voltage battery and includes a guide pin inserted into the guide hole.

14. The side sill assembly of claim 1, further comprising: a rear inner member that is located inside the rear outer member and fastened to a rear floor panel for the vehicle.

15. The side sill assembly of claim 14, wherein in a portion adjacent to a rear end of a battery frame fastened to a side surface of a high voltage battery, the high voltage battery is fastened to the rear inner member by a fastening bolt penetrating the battery frame.

16. The side sill assembly of claim 14, wherein in a portion in which the center member and the rear inner member overlap each other, a high voltage battery is fastened to the rear inner member and the center member by a fastening bolt penetrating a battery frame fastened to a side surface of the high voltage battery and the rear inner member.

17. The side sill assembly of claim 1, wherein the front outer member and the rear outer member have same cross sections.

18. The side sill assembly of claim 17, wherein the front outer member comprises:

an outer housing formed on a widthwise outside of the vehicle;

an inner housing located inside the outer housing and having an upper end and a lower end connected to the outer housing such that a cylindrical structure is formed;

at least one main horizontal partition wall configured to vertically partition a space formed by the outer housing and the inner housing; and a vertical partition wall configured to partition a space of the lower portion of the horizontal partition wall located on a lowermost end among the at least one partition wall in the width direction of the vehicle.

* * * * *